UNITED STATES PATENT OFFICE.

ADRIAN C. SELBY, OF COVINGTON, KENTUCKY.

SOAP.

SPECIFICATION forming part of Letters Patent No. 245,231, dated August 2, 1881.

Application filed May 16, 1881. (No specimens.)

*To all whom it may concern:*

Be it known that I, ADRIAN C. SELBY, of Covington, in the county of Kenton and State of Kentucky, have invented a new and useful Improvement in Soap; and I do hereby declare that the following is a full, clear, and exact description of the same.

My invention relates to an improved soap; and it consists in the combination of certain ingredients compounded in the proportions and in the manner hereinafter described.

I take two and one-half pounds tallow and melt it, by a gentle heat, in a kettle or pot, and when melted add to it two ounces of olive-oil. Take two and one-fourth pounds sal-soda and one and one-eighth pound good unslaked lump lime, and put the lime and sal-soda together in a large crock, bowl, or clean vessel, and pour over them two and one-eighth gallons boiling soft water. Stir the mixture of lime and sal-soda and let it settle. Then pour off the clear solution of lime and sal-soda into another clean vessel, being careful that none of the settlings are poured off. Then pour the clear solution of lime and sal-soda, a little at a time—say one quart at a time—into the kettle containing the melted tallow and olive-oil and boil the contents. When it begins to boil stir it briskly until an abundant white scum appears. Then pour in more of the clear solution, and when the contents begin to boil again stir briskly, and so continue until all the clear solution of lime and sal-soda are poured into the kettle with the tallow and olive-oil. Continue to boil the mixture and stir all the time until it unites and becomes of the consistency of thick soap. Then stop boiling it, but keep it near the boiling-point. Take two pounds sal-soda and one and one-sixteenth pounds good unslaked lump lime, put them together in a large crock, bowl, or clean vessel, and pour over them one and one-half gallons of boiling soft water. Stir the lime and sal-soda well and let it settle. Then pour off the clear solution of lime and sal-soda into another kettle or pot, being careful that none of the settlings are poured off, and heat this clear solution, and when it begins to boil pour into it two pounds of pulverized rosin by adding about two ounces of the rosin every two or three minutes until the two pounds are poured in, keeping up a rapid stirring of the contents from the time the first rosin is put in. Then keep this mixture boiling gently for ten minutes after the rosin is all poured in, stirring all the time. Then decant this mixture of rosin and lime and sal-soda solution into the first kettle with the tallow soap and heat it near the boiling-point, and stir it until it assumes a uniform color. Then stop the heat and have three ounces of borax and four ounces of alum dissolved in one quart of boiling water, which solution add to the soap in the kettle and heat the contents slightly, and stir until a thick curd appears on the surface of the soap. Then have one and one-half ounce white wax and one ounce of spermaceti melted together by heating in a small vessel. Then effect a thorough union of the white wax and spermaceti with the soap in the kettle by keeping the soap warm and pouring in a little at a time of the wax and spermaceti and stirring the contents well. Then add one-half gallon of warm soft water and boil for ten minutes, stirring well. Take the soap away from the fire and, when cooled for ten minutes, add one and three-fourths ounce of benzine. Stir again for five minutes and it will be finished, and when cold will be solidified, and can be cut into bars, dried, (and pressed, if desired,) and made ready for the market.

The ingredients mentioned in the foregoing formula, when compounded and operated upon according to the formula, will make sixteen pounds of firm, hard soap, very superior in quality, removing all kinds of grease or oils, or any kind of paint from clothing, requiring little or no rubbing in washing ordinary clothing, and having medicinal properties which will, nine times out of ten, cure any cutaneous disease, such as tetter, ring-worm, &c.

I am aware of the fact that most of the ingredients hereinbefore named have heretofore been used in soap mixtures, and I lay no claim to them separately, but only to the same when prepared and used in combination, as described.

Having thus described my invention, what I claim as new is—

A soap composed of tallow, olive-oil, sal-soda, unslaked lime, rosin, borax, alum, white wax, spermaceti, and benzine, which ingredients are prepared in the manner and combined in about the proportions described.

ADRIAN CLAYTON SELBY.

Witnesses:
   A. BECKER,
   WILLIAM LEE.